United States Patent [19]

Wier et al.

[11] 4,456,086

[45] Jun. 26, 1984

[54] INTEGRATED WHEELCHAIR AND AMBULATOR

[75] Inventors: John P. Wier; Robert A. Garrett, both of San Diego, Calif.

[73] Assignee: The United States of America as represented by the Secretary of the Navy, Washington, D.C.

[21] Appl. No.: 62,835

[22] Filed: Aug. 1, 1979

[51] Int. Cl.³ ............................................. A61G 5/00
[52] U.S. Cl. ..................................... 180/11; 180/333; 180/907; 297/DIG. 4; 297/DIG. 10
[58] Field of Search ..................... 180/14 R, 77 R, 11, 180/DIG. 3, 313, 333; 280/284 WC, 242 WC; 297/DIG. 4, DIG. 10

[56] References Cited

U.S. PATENT DOCUMENTS

| | | | |
|---|---|---|---|
| Re. 28,103 | 8/1974 | Schwartz | 180/9.24 R |
| 806,295 | 12/1905 | Schmidt | 180/DIG. 3 |
| 3,405,954 | 10/1968 | Wolfe | 280/289 WC |
| 3,907,051 | 9/1975 | Weant | 180/DIG. 3 |
| 3,921,740 | 11/1975 | Forster | 180/DIG. 3 |
| 4,054,319 | 10/1977 | Fogg | 297/DIG. 10 |
| 4,076,304 | 2/1978 | Deucher | 297/DIG. 10 |
| 4,120,530 | 10/1978 | Imbro | 297/DIG. 10 |
| 4,138,156 | 2/1979 | Bonner | 297/DIG. 10 |

FOREIGN PATENT DOCUMENTS 2625046 12/1977 Fed. Rep. of Germany ... 297/DIG. 10

Primary Examiner—John A. Pekar
Attorney, Agent, or Firm—R. F. Beers; E. F. Johnston

[57] ABSTRACT

An ambulator which can be mated to a wheeled frame to form a wheelchair is provided to enable a paraplegic to stand on the ambulator and be separated from the frame for maneuvering in confined spaces. The ambulator has power operated articulated linkage for raising the paraplegic out of and free of the frame to the standing position on the ambulator; the compact base of the ambulator containing a drive mechanism for moving the ambulator in any desired direction through controls conveniently located on an arm rest. When the ambulator is mated with the frame, the linkage is lowered to carry the paraplegic in the sitting position.

2 Claims, 3 Drawing Figures

INTEGRATED WHEELCHAIR AND AMBULATOR

CROSS REFERENCE TO RELATED APPLICATIONS

This invention is related to U.S. patent application, Ser. No. 955,427 entitled "Ambulator Control Circuitry" filed Oct. 27, 1978, now U.S. Pat. No. 4,284,929, by one of the Applicants and directed to the electrical control circuit for the ambulator drive mechanism; and to U.S. patent application Ser. No. 007,285 entitled "Ambulator Drive Mechanism" also filed Jan. 29, 1979, now U.S. Pat. No. 4,258,815, by Applicants and directed to the novel details of the ambulator drive mechanism.

BACKGROUND OF THE INVENTION

This invention relates to mobile equipment for a partially paralyzed person, and more particularly to such equipment that is more compact and highly maneuverable to enable work to be performed by the person in a standing position in confined spaces normally inaccessible by a wheelchair.

Numerous types of mobile equipment have been designed in an effort to accommodate the various needs for an orthopedically disabled person. Recently there has been a recognition of the need for equipment to elevate such a person from a horizontal or sitting position to a standing position. There are therapeutic and medical advantages for a paraplegic to be able to stand in an erect position. The ambulator will make it easier for the paraplegic to live in an environment where most functions are accomplished in an upright position, e.g. cooking at a range or working at a workbench or sink. However, the psychological benefit of the ability to converse at eye level may be the greatest benefit.

This type of equipment is best illustrated in U.S. Pat. No. 4,054,319 issued Oct. 18, 1977, for "Stand-Aid Wheelchair." In that patented equipment the raising and lowering linkage for the paraplegic is made an integral part of the wheelchair. Although this wheelchair supported the paraplegic in a standing position, because of its size is limited in accessibility to confined areas. In addition, because the linkage is not coordinated with the articulated joints of the occupant's body, it was necessary in the patented equipment to use a narrow flexible lifting strap for raising the person off the wheelchair seat to minimize friction that will displace the person's clothing during the relative movement. For a similar reason, a backrest was necessarily designed to be reciprocable to move with the clothes on the person's back during the raising and lowering operations.

In U.S. Pat. No. Re. 28,103 issued Aug. 6, 1974, entitled "Invalid Mobility Bench" a pair of Farnham-type crutches are anchored on individually movable base carriages which support each foot of the invalid. Each crutch is telescopically power-operated for lifting and lowering the invalid supported therebetween on a fabric sling. The motor in each base carriage is individually controlled by the invalid at the hand grip of each crutch to simulate a walking gait.

SUMMARY OF THE INVENTION

The combination of a motor-driven frame and a separable mating ambulator offers numerous advantages over prior art wheelchair. The ambulator is provided with a linkage mechanism for raising and lowering the paraplegic frame from and to the frame. With the paraplegic supported by the linkage in a standing position on the ambulator platform, the ambulator can be detached from the frame and easily maneuvered by the paraplegic in and around confined spaces not possible by the conventional prior art wheelchair. The linkage is provided with armrests which are articulated to remain in a substantially horizontal position throughout the raising and lowering operations providing the paraplegic with lateral support, which enhances his confidence in the equipment and his ability to accomplish his tasks. The armrest also provides a convenient location for a joy stick for controlling the steering of the ambulator drive mechanism, as well as a separate control for the raising and lowering linkage.

The novel adjustable linkage is pivotable at the vicinity of both the knees and hip joints of the user so that there is no substantially relative movement between the ambulator seat and backrest, and the clothes of the paraplegic during the raising and lowering movements that would otherwise dishevel the clothes and be a source of annoyance to the paraplegic.

OBJECTS OF THE INVENTION

One object of this invention is to provide an ambulator detachably matchable with a motor-driven frame wherein the ambulator can be readily separated to movably support a paraplegic in a standing position.

Another object of this invention is to provide a small and compact ambulator capable of maneuvering in confined spaces with increased mobility and accessibility.

Still another object is to provide an adjustable raising and lowering linkage mechanism for the ambulator that will not cause the clothes of the paraplegic to be disheveled during the raising and lowering movements with the motor-driven frame.

DESCRIPTION OF A PREFERRED EMBODIMENT

Figure 1:
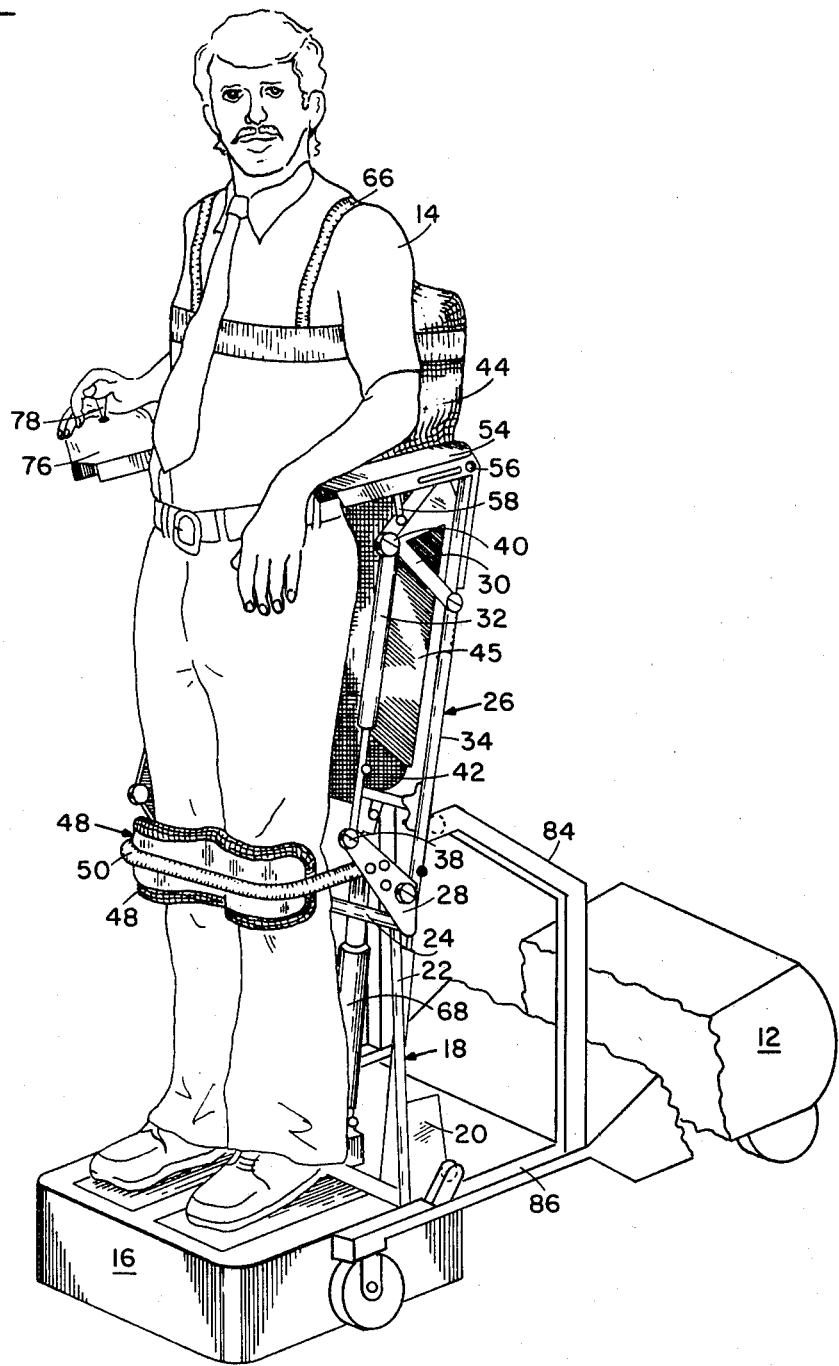
FIG. 1 is a side perspective view of a paraplegic being supported in a standing position on the ambulator shown separated from the integrated motor-driven frame.
Figure 2:
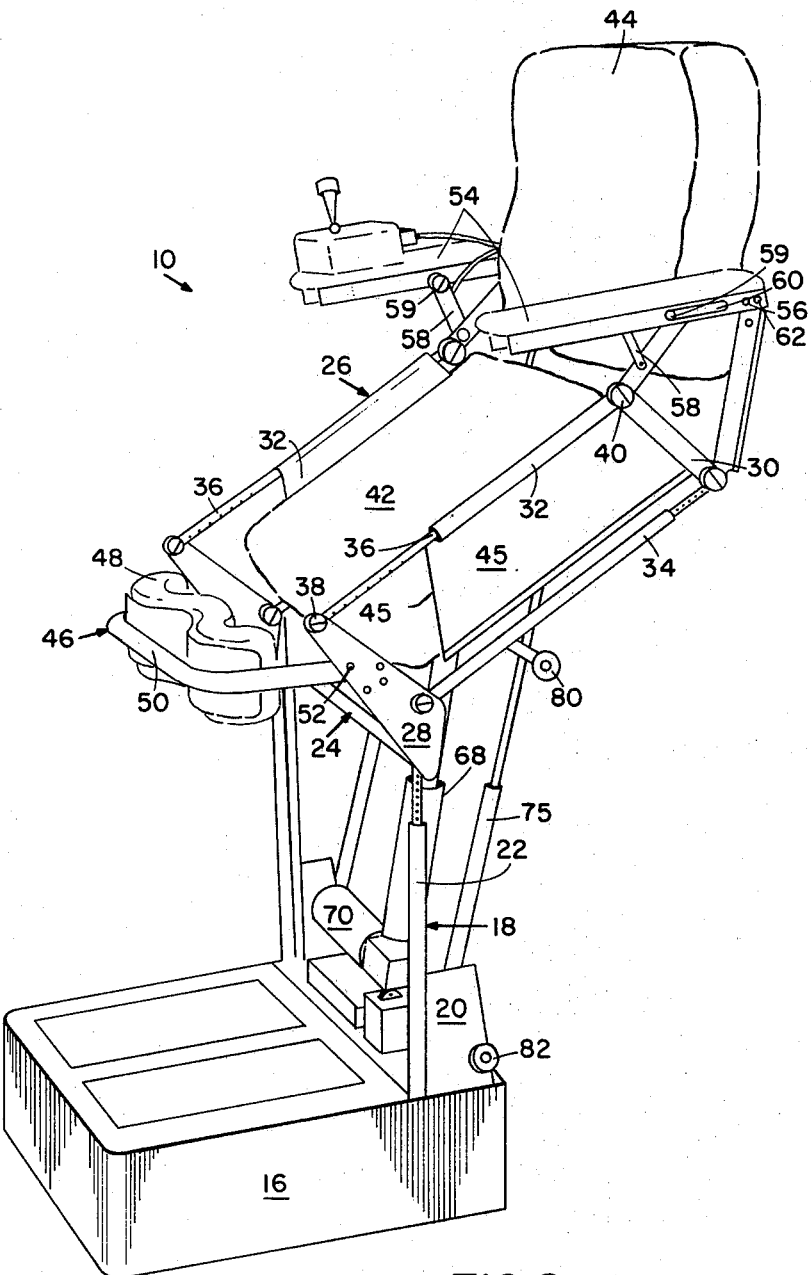
FIG. 2 is a side perspective view of the ambulator with the linkage in a midway position between the upright and lowered positions.
Figure 3:
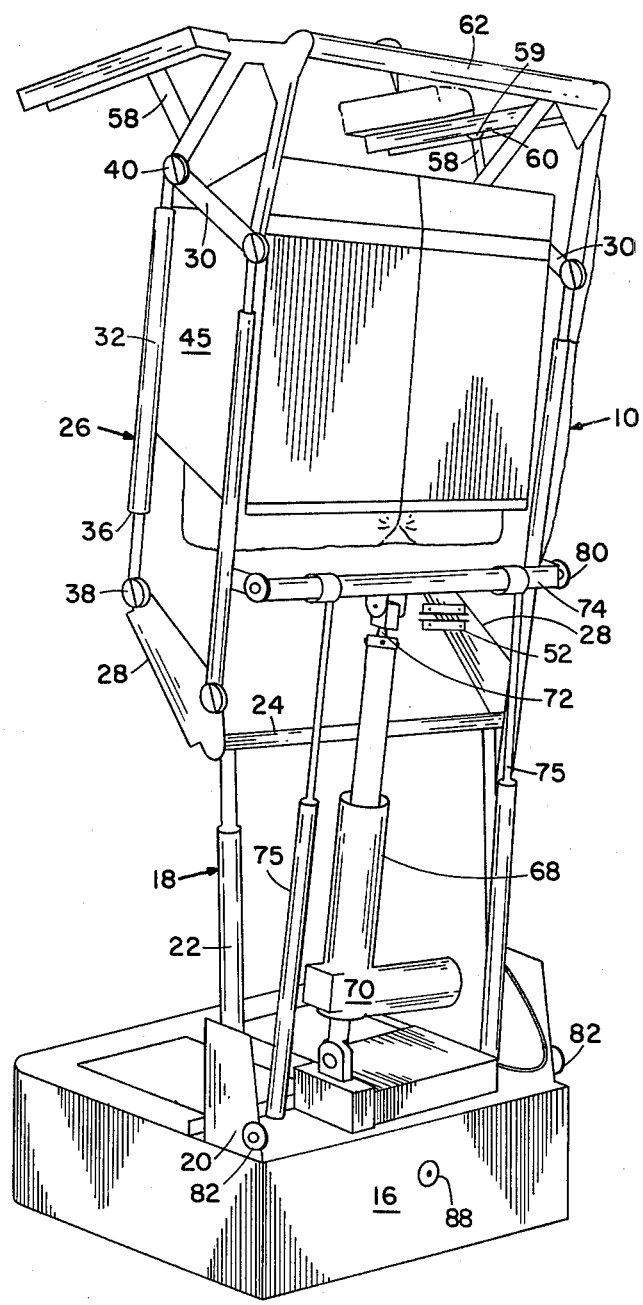
FIG. 3 is a rear view of the ambulator in an upright position.

Referring to the drawings where like reference numerals refer to similar parts, there is in FIG. 1 an ambulator 10 shown separated from a motor-driven frame 12 for supporting a paraplegic 14 in a standing position. The ambulator 10 and the frame 12 are connected to form a wheelchair when the paraplegic is to be supported in a sitting position. The manner in which the ambulator and motor-driven frame are separably connected will be described later.

Ambulator 10 comprises a small base 16 which houses a unique drive mechanism the details being described in Applicants' above identified patent application. An inverted U-shape tubular frame 18 is bolted to base 16 by knee plates 20, the upright frame members 22 being shown telescopically constructed to be adjustable in height for a reason to be explained. Journaled on opposite ends of frame crosspiece 24 is an articulated linkage system 26 which supports all of the remaining ambulator components.

Linkage system 26 comprises two sets of links formed generally in a parallelogram configuration, one set on each side of the ambulator. Each set of links includes a pair of forward and rearward end links 28 and 30, respectively, hinged at their ends to a pair of upper and lower side links 32 and 34, respectively, the latter pair of links being constructed to be telescopically adjustable in length at 36.

An important feature of this invention resides in locating the forward pivot points 38 and 40 of the linkage substantially aligned horizontally with the knee and hip joints, respectively, of the paraplegic that will use the ambulator. This arrangement of the linkage minimizes the relative movement between the paraplegic's clothing in contact with an ambulator seat 42 and a back support 44 during the raising and lowering movements. Without this novel arrangement, the paraplegic's clothing will be disheveled by any significant relative movement of his body with the seat and backrest and be a source of annoyance and discomfort. Seat 42 is secured within a U-shaped channel member 45 suspended from upper links 32.

To achieve this object, uprights 22 and upper and lower links 32 and 34 are made telescopically adjustable in length, as previously described, to enable the linkage to be tailored to the specific body dimensions of the paraplegic using the ambulator.

The paraplegic's legs are laterally supported by a knee restraint 46 comprising a set of concave pads 48, one for each lower leg, fixed on a U-shaped bracket 50, the ends of the bracket being slidably mounted to guides 52 on both end links 28. With this construction, knee restraint 46 follows the forward and rearward movement of the legs during the raising and lowering of the linkage.

The upper torso of the paraplegic is supported laterally on a pair of armrests 54 hinged at 56 to the upper end of link 30 which has a bellcrank configuration. A brace 58 is pivoted at one end to each link 30 and the other end has a roller 59 confined in armrest slot 60 to provide intermediate support to the armrests to maintain them in a substantially horizontal orientation throughout the raising and lowering of linkage 26.

A spreader rod 62 is bracketed at both ends to the upper ends of bellcranks 30, and to which is riveted the upholstered backrest 44. As shown in FIG. 1, a chest and shoulder strap assembly 66 may be provided to support the upper torso of the paraplegic against the backrest.

The ambulator linkage is raised and lowered by a jacking screw 68 driven by a DC motor 70, the latter being pivoted at its bottom end to ambulator base 16. The upper end of screw 68 is pivoted at 72 to a U-shaped crosspiece 74 welded at each of its ends to an intermediate point on lower links 34. A pair of self-contained telescopic gas springs 75, one on each side of jacking screw 68, are also pivoted at the lower ends to base 16 and at their upper ends to crosspiece 74 to smooth out the raising and lowering movements by jackscrew 68.

A manual switch 76, for controlling raising and lowering motor 70, is conveniently located on either the left hand or right hand armrest 54, as is the joy stick switch 78 for controlling the ambulator drive mechanism.

The ambulator is designed to be mated to motor-driven frame 12 by a pair of upper and lower rollers 80 and 82, respectively. When mated, the ambulator and frame form a wheelchair suitable for supporting a paraplegic in a sitting position. Upper rollers 80 are each welded to one side of link 34, and lower rollers 82 are each mounted to knee plates 20. Upper rollers 80 are positioned to slide into upper guide rails 84 of the motor-driven frame, and lower rollers 82 and designed to slide into lower guide rails 86 of the motor-driven frame. Upper and lower guide rails are configured so that the lowering of the ambulator linkage by jacking screw 68 will cause the respective rollers by engagement with the guide rails to lift ambulator base 16 several inches off the floor when the ambulator is fully nested into the motor-driven frame. This provision will enable the motor-driven frame to be maneuvered by its own drive mechanism independent of the ambulator. A switch 88 on the ambulator when automatically engaged with a switch on the frame when mated transfers joy stick 78 control from the ambulator drive mechanism to the wheelchair drive mechanism.

The ambulator of this invention offers a practical and versatile solution to the problem of obtaining greater accessibility to confined areas by the paraplegic to accomplish a variety of tasks without the presence of a cumbersome wheelchair. The ability of a paraplegic to be able to move around in a stable standing position is of medical importance in that it stresses his bone structure and improves circulation. Thus the novel equipment improves the paraplegic's health, as well as providing a psychological feeling of well being. The ambulator provides the paraplegic with a high degree of maneuverability to accomplish a plurality of tasks. When the paraplegic no longer requires the ambulator he can reunite it with the wheelchair, utilizing the integrated structure as a conventional wheelchair.

Obviously, many other modifications and variations of the present invention are possible in the light of the above teachings. It is therefore to be understood that within the scope of the appended claims the invention may be practiced otherwise than as specifically described.

What is claimed is:
1. An independently maneuverable ambulator for supporting and moving a paraplegic, comprising:
   a self-propelled, maneuverable base;
   a framework of linkage mounted on the base for raising and lowering the paraplegic between a standing position and a sitting position;
   a seat carried on said linkage to be held in a horizontal position for seating the paraplegic when said linkage is lowered, and in a substantially vertical position for supporting the paraplegic when said linkage is raised;
   said linkage being articulated at substantially the knee and hip joints of the paraplegic to minimize relative movement between the surface of the seat and the paraplegic's clothing, and said linkage being telescopically adjustable to be tailored to the body dimensions of the paraplegic;
   a motor-driven erection mechanism for raising and lowering said linkage, said erection mechanism comprising reversible drive means pivotally mounted on said base and reciprocating means operatively coupled to the driven means at one end and pivotally connected to the framework linkage at the one end; and a knee restraint is mounted to said linkage to follow the movement of the legs during the raising and lowering movement.

2. An independently maneuverable ambulator for supporting and moving a paraplegic in a standing position, comprising:
- a self-propelled, maneuverable base;
- a pair of uprights rigidly secured to the base, each upright being telescopically adjustable in height;
- a framework of linkage pivotally mounted on each upright for raising and lowering the paraplegic between a standing position and a sitting position;
- each of said frameworks comprising a set of four links arranged in a parallelogram configuration having two short links and two long links each link being pivotally mounted to adjacent links, and each of the long links being telescopically adjustable in length;
- whereby the length of the uprights can be tailored to the distance between the feet and knees of the paraplegic, and the length of the links can be tailored to the distance between the knees and the buttocks of the paraplegic;
- a seat mounted between said sets of links; and
- a knee restraint member mounted to said sets of links;
- whereby the seat and the knee restraint member move in conjunction with the movement of the paraplegic between the standing and sitting positions.

* * * * *